United States Patent [19]

Doyle

[11] 4,207,467
[45] Jun. 10, 1980

[54] FILM MEASURING APPARATUS AND METHOD

[75] Inventor: Walter M. Doyle, Laguna Beach, Calif.

[73] Assignee: Laser Precision Corp., Utica, N.Y.

[21] Appl. No.: 939,271

[22] Filed: Sep. 5, 1978

[51] Int. Cl.$^2$ .............................................. G01J 1/00
[52] U.S. Cl. ...................................... 250/338; 250/391; 250/353; 356/382
[58] Field of Search .............. 250/338, 339, 340, 341, 250/353; 356/382, 429, 430

[56] References Cited

U.S. PATENT DOCUMENTS

| | | | |
|---|---|---|---|
| 2,429,066 | 10/1947 | Kughni | 356/382 |
| 3,198,946 | 8/1965 | Atwood | 250/353 |
| 3,994,586 | 11/1976 | Sharkins et al. | 250/341 |

*Primary Examiner*—Davis L. Willis
*Attorney, Agent, or Firm*—Thomas J. Plante

[57] ABSTRACT

An optical apparatus is disclosed which monitors the thickness of a thin film carried by a reflecting substrate. In order to minimize light detection problems caused by inadvertent displacement of the substrate, the light source and detector are located on the same "side" of the optical apparatus, and retro-reflector means are located at the other "side" of the optical apparatus, so that the light is reflected from the substrate to the retro-reflector means, back to the substrate, and thence back to the detector. In the preferred embodiment, the retro-reflector means comprises an array of small retro-reflectors.

9 Claims, 5 Drawing Figures

FILM MEASURING APPARATUS AND METHOD

BACKGROUND OF THE INVENTION

This invention relates to optical apparatus for measuring the thickness or chemical composition of partially transparent films, which are either self-supporting or attached to a reflecting subtrate. Such equipment is useful in laboratory settings, and is also highly valuable for process control functions. It is particularly desired to provide an industrial coating monitor which will function on-line during the manufacturing process to measure continuously the thickness of plastic coatings on metal surfaces.

In my previously filed application, Ser. No. 687,240, now U.S. Pat. No. 4,129,781 filed May 17, 1976, I disclosed a film thickness measuring arrangement in which infra-red radiation strikes the film surface at an angle of incidence which is at or near its Brewster's angle. If the radiation is polarized in its plane of incidence, reflection from the film surface is largely eliminated, thereby greatly improving the accuracy of measurement of the film.

In the usual arrangement of this type, the radiation is reflected from a substrate below the film. Detection of the reflected radiation is affected adversely by any failure of the substrate to remain in an unchanging location with respect to the optical apparatus. In other words, target displacement reduces the effectiveness of detection, whether the displacement is due to tilting of the substrate, bending of the substrate, or displacement of the substrate while it remains parallel to its original position.

Prior to development of the apparatus disclosed in my earlier application, the most common arrangement of optical apparatus caused the radiation to strike the film and its substrate on a line perpendicular to their surfaces. While displacement of the substrate in such a situation (radiation normal to the surface) reduces detection efficiency, the off-normal incidence of the radiation on the surface, as in the Brewster's angle design, suffers from increased sensitivity to target displacement, since this shifts the image laterally. As a result, even a small displacement can cause the radiation to completely miss the detector.

SUMMARY OF THE INVENTION

The purpose of this inventions is to provide a means for measuring the reflectance characteristics of specular targets with minimal dependence on target position or flatness. More specifically, the present invention is designed to measure the thickness of coatings on metal substrates with improved tolerance of variations in target distance.

The desired result is, in essence, obtained by using retro-reflector to return the radiation back toward its source. This means that the radiation is reflected twice from the substrate, and that the radiation detector is located in the vicinity of the radiation source, since the retro-reflector is in the location occupied by the detector in the system disclosed in my earlier application.

DETAILED DESCRIPTION OF SPECIFIC EMBODIMENTS

Figure 1:
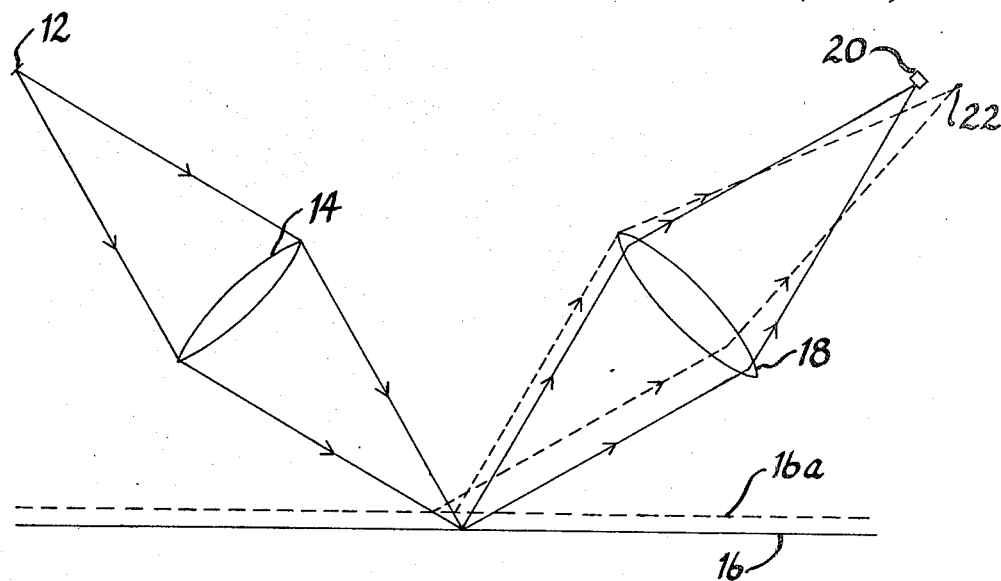
FIG. 1 is a schematic illustration showing, with exaggerated dimensions, the problem encountered by the apparatus of my prior applicaton when the reflective target is displaced.

The problem is illustrated in FIG. 1. The solid lines illustrate the optical effect when the target is in its proper position. The dashed lines are used to show, in exaggerated form, the difficulties encountered when the target is displaced from its intended position. Such displacement is a common occurrence in mechanically actuated systems.

As shown by the solid lines, the radiation from a source 12 passes through a lens 14, then is reflected from a specular target 16. For reasons explained in detail in my prior application, Ser. No. 687,240, it is desirable that the radiation strike the target at the Brewster's angle of the film which is to be measured. (In the figures, the film is not shown separately from the substrate, because the invention can be more clearly illustrated by showing only the reflecting substrate surface. In actual practice, the reflecting substrate supports a film, the characteristics of which are being measured by the optical apparatus).

The radiation reflected from substrate 16 is shown passing through lens 18 to be focused on detector 20. A single infrared detector is shown, whereas the actual instrument would use a combination of three detectors and additional optics. However, the details of the detector portion of the system are no germane to present disclosure.

If the specular target—the substrate surface 16—is inadvertently moved to the position shown by dashed line 16a, the reflected radiation will follow the paths shown by the dashed raiation-path lines, creating an image 22, which is displaced from the detector 20. The result is a significant loss of accuracy of the optical apparatus.

The problem would be even more pronounced if the displacement of the target were of a more serious nature. In the illustration, the target is shown displaced to a position which is still parallel to its original position. Other displacement modes which are more difficult to cope with are tilting of the target surface or bending of the target surface.

If the only displacement problem were the change to a parallel position illustrated in FIG. 1, a substantial solution could be provided by using a collimating lens in place of lens 14, with the result that the radiation would be collimated when it strikes the target. As long as the target is flat, smooth, and not tilted or bent, the radiation passing through a collimating lens would remain collimated after reflection, and would follow parallel paths even if the target has been displaced.

Figure 2:
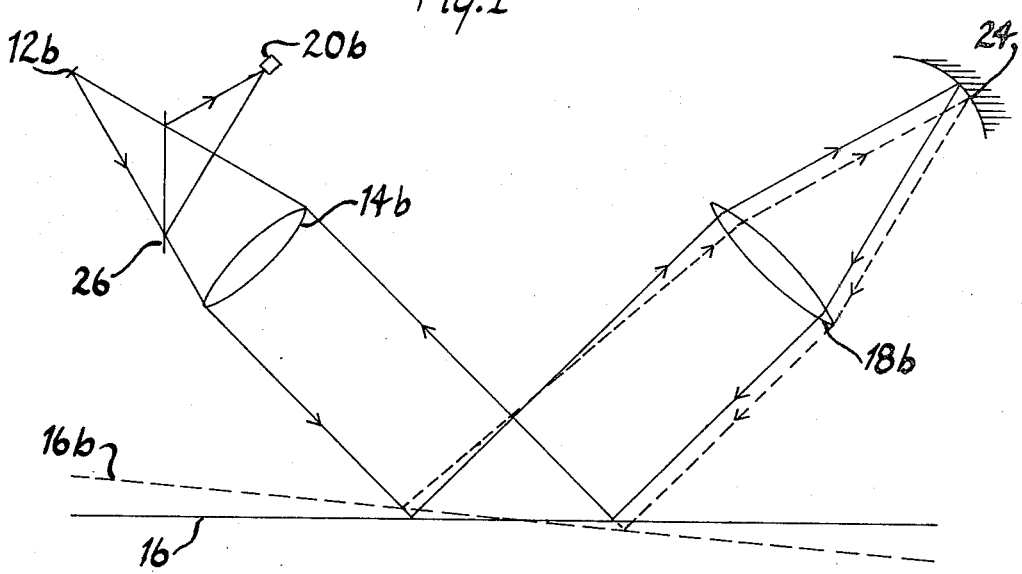
FIGS. 2 and 3 are schematic showings of one embodiment of the present invention, illustrating two different target displacement situations.

FIG. 2 illustrates a more complete solution of the problem than collimation alone. A curved mirror 24 replaces the detector at the right side of the figure. The combination of the lens 18b and the curved mirror 24 constitutes a "cat's-eye" retro-reflector. Any ray which enters the lens 18b, is reflected by the mirror 24, and again passes through the lens 18b, will emerge from this lens on a path parallel to its entering path.

The rays reflected from mirror 24 strike the specular target again, and are reflected back toward the source 12b. This requires that the detector 20b be located on the "same side" of the apparatus as the radiation source, ie., on the left side as viewed in the figure.

Since the radiation transmitted from the source 12b and that received by detector 20b pass through the same lens 14b (which is illustrated as a collimating lens), a partly reflecting beam-splitter 26 is used to provide separation of the source 12b and detector 20b. Although the radiation striking the target is shown to be collimated, this is not necessary for the system's operation.

Mirror 24 is placed at or near the focal point of lens 18b. Ideally, the surface of the mirror would be curved to conform to the lens focal plane. But this requirement is not strict and the system will work reasonably well even with a flat mirror.

The effect of target displacement is shown by the dashed lines, which illustrate the target tilted to position 16b. In this figure, the assumed displacement is target tilt, which (as stated above) creates a more difficult problem than displacement of the target to a position parallel to its original position.

For the collimated case illustrated, the effect of target tilt is quite easy to understand. The radiation is imaged in the lens' focal plane and hence on the mirror surface, independent of target angle. Thus, the reflected radiation will be collimated by the lens, will strike the target at the original reflectance angle, will be reflected back to lens 14b on a parallel path, and will be imaged on the detector 20b. Collimation of the radiation contributes to the effectiveness of the apparatus illustrated in FIG. 2. With a single, large retro-reflector, as shown in the figure, non-collimated radiation will not produce the desired result.

Displacement of the target in FIG. 2 to a position parallel to its original position, ie., displacement of the type illustrated in FIG. 1, will be no problem with the retro-reflector system of FIG. 2 because such displacement will not affect the image position in the retro-reflector mirror 24. In other words, the image will strike the mirror 24 at the same point after parallel displacement as it did before such displacement; the mirror focal points will not be spaced as shown in FIG. 2.

Figure 3:
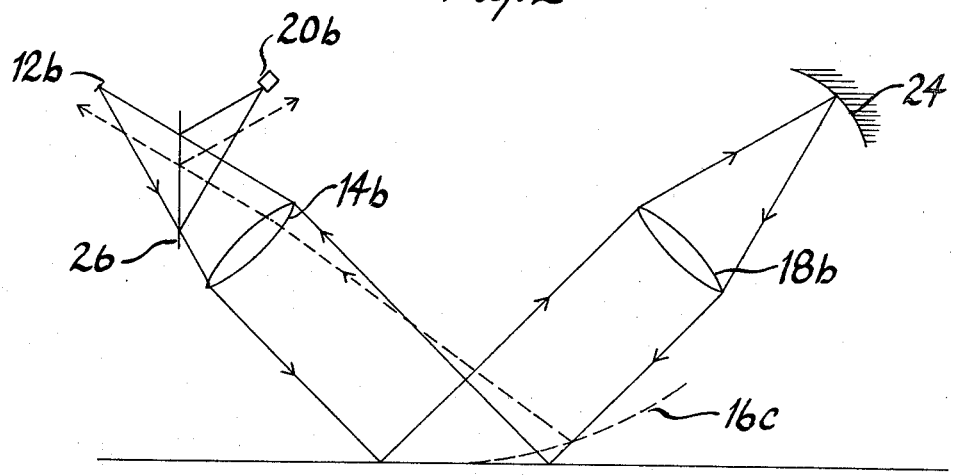

The third type of target displacement—bending displacement—does create a problem in the optical apparatus of FIG. 2. This problem is illustrated in FIG. 3, where the change in position due to target bending is exaggerated to provide a clear illustration of the problem. As shown in FIG. 3, the right portion of the target is bent upwardly, as shown by the dashed line position 16c of the target. This causes the radiation which strikes the bent surface to return toward the beamsplitter 26 on a line angularly deviating from the line it would follow if the surface were not bent. The end result of such angular deviation is that the radiation misses the detector 20b.

Figure 4:
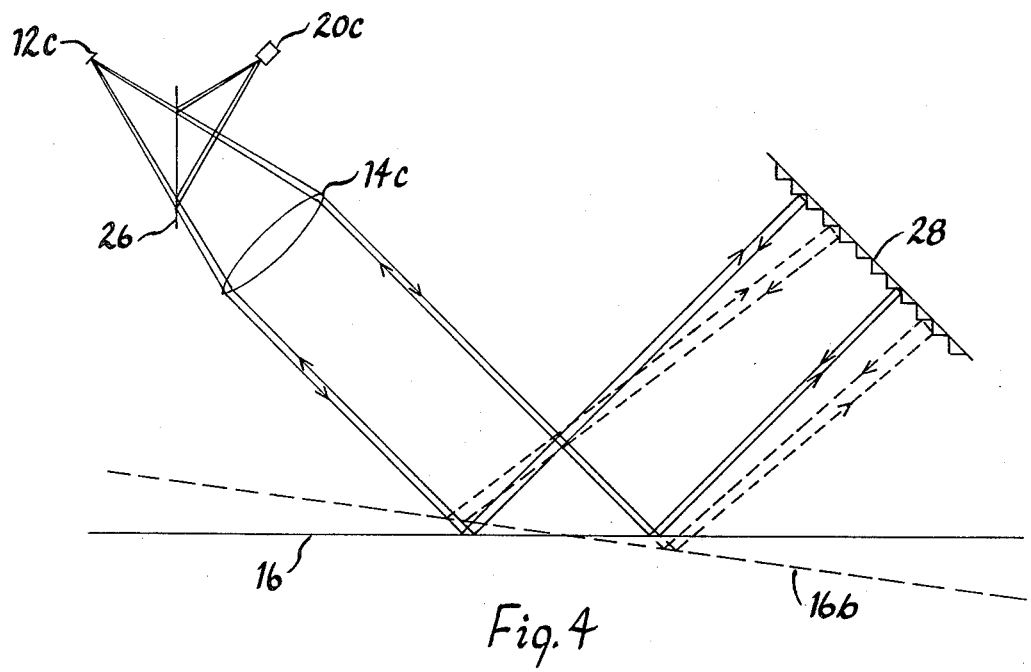
FIGS. 4 and 5 are schematic showings of the preferred embodiment of the present invention, illustrating two different target displacement situations.
Figure 5:
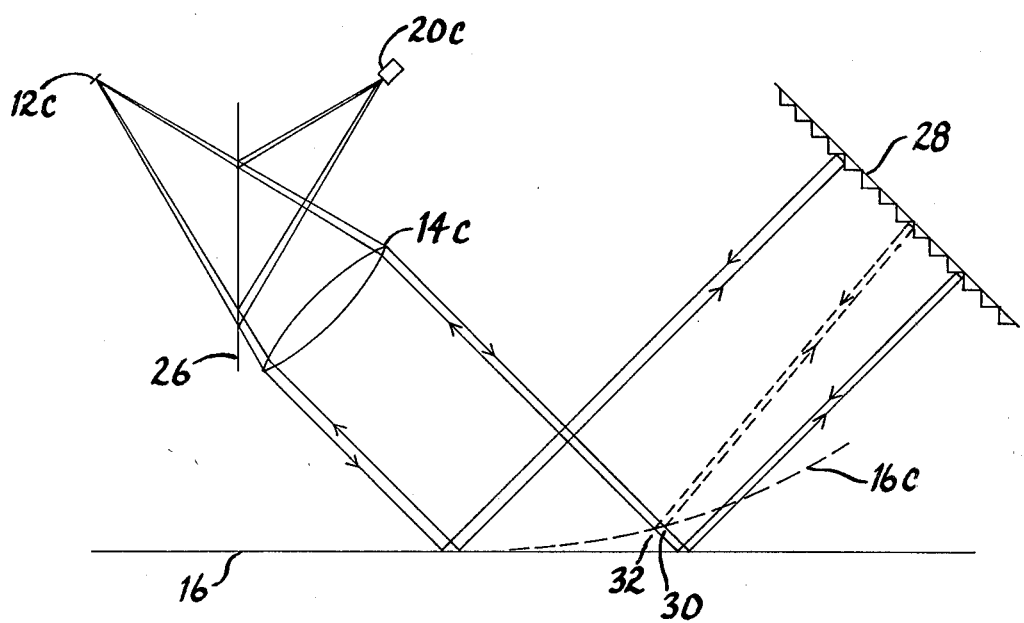

In order to improve further the performance of the optical apparatus shown in FIGS. 2 and 3, which incorporates a single, relatively large retro-reflector, I propose to use an array of small retro-reflectors, as shown in FIGS. 4 and 5.

In FIGS. 4 and 5, the retro-reflecting mirror consists of an array of small retro-reflectors 28, which are illustrated as "cube corners" These cube corners provide individual retro-reflecting mirrors which return the radiation toward the target 16. Because the light rays leaving the small retro-reflectors are not displaced very far from the light rays striking such retro-reflectors, and because they follow parallel lines, tilting of the target 16 to the dashed line position 16b in FIG. 4 causes negligible deviation of the rays returning to the detector 20c. Parallel displacement of the target would have even less effect on the functioning of the apparatus in FIG. 4.

Use of the "cube corner" retro-reflectors in the apparatus of FIGS. 4 and 5 eliminates the need for the lens 18b of FIGS. 2 and 3. Such a lens is, in effect, part of the "cat's-eye" retro-reflector shown in FIGS. 2 and 3. The retro-reflector types could be reversed in the figures. In other words, a large cube corner retro-reflector would function in place of the cat's-eye retro-reflector of FIGS. 2 and 3, and an array of cat's-eye retro-reflectors could be used to obtain the benefits of the apparatus shown in FIGS. 4 and 5. The significant advantage of the apparatus of FIGS. 4 and 5 over that of FIGS. 2 and 3 lies in the substitution of an array of relatively small retro-reflectors, each of which reflects incident radiation back on a parallel path. Since the dimensions of the individual retro-reflectors are quite small, the lateral displacement of an individual ray is minimized, and the effects of target distortion are correspondingly reduced. In a single, large retro-reflector, a ray entering on one side will typically re-emerge on the other, thereby making the effect of target bending more serious if the change in target surface angle is significant over the area illuminated.

Of the three target position displacement problems, bending displacement is the most difficult to compensate for. FIG. 5 illustrates the improvement in bending displacement compensation provided by the array of small retro-reflectors. In FIG. 5, the dashed line 16c shows, in exaggerated dimension, the effect of bending of the target 16. It will be noted that there is very little change in the incidence angle of light rays at points 30 and 32, because the points are very closely spaced. (The points 30 and 32 are the reflection points on the target surface of the same radiation going toward and returning from the retro-reflector array). This contrasts with the substantial change in incidence angle of the target-reflected radiation going toward and returning from the retro-reflector in FIG. 3.

From the foregoing disclosure, it is apparent that target displacement can be a problem where the characteristics of a film carried by a reflecting substrate are being measured. The problems of target displacement can be categorized as threefold: parallel displacement, tilting displacement, and bending displacement. The first two are effectively solved by the use of a retro-reflecting mirror in the optical apparatus. Such a retro-reflector is located on the side, or arm, of the apparatus opposite the source, so that it reflects radiation back toward the source. The detector is located on the same side, or arm, of the apparatus as the source, and a beamsplitter may be used to deflect the returning radiation toward the detector. The radiation follows the complete optical path twice, and is reflected twice from the substrate, or target.

Solution of the bending displacement problem is best accomplished by using an array of small retro-reflectors, thereby minimizing the lateral displacement of individual rays as they go toward and return from the retro-reflector array.

The following claims are intended not only to cover the specific embodiments disclosed, but also to cover the inventive concepts explained herein with the maximum breadth and comprehensiveness permitted by the prior art.

What I claim is:

1. An optical apparatus for measuring a characteristic of a film carried by a reflecting substrate comprising:
    a radiation-propagating means so oriented that the radiation strikes the film and substrate at an angle other than perpendicular;
    retro-reflector means which is located at the side of the apparatus remote from the radiation-propagating means and which receives the radiation reflected form the substrate and returns it toward the substrate on lines substantially parallel to those of the radiation coming toward the retro-reflector; and
    detector means which is located at the side of the apparatus near the source and which receives the radiation reflected from the substrate on its return from the retro-reflector means.

2. The optical apparatus of claim 1 wherein the retro-reflector means comprises an array of relatively small individual retro-reflectors, thereby minimizing the lateral displacement of individual rays as they go toward and return form the retro-reflector means.

3. The optical apparatus of claim 2 wherein the individual retro-reflectors are cube-corner shaped.

4. The optical apparatus of claim 1 wherein the retro-reflector means comprises a concavely-curved mirror and a lens through which radiation passes as it goes toward and returns from the mirror.

5. The optical apparatus of claim 1 wherein the thickness of the film is the characteristic measured.

6. The optical apparatus of claim 1 which also includes a collimating lens between the radiation-propagating means and the reflecting substrate.

7. The optical apparatus of claim 1 which also includes a beamsplitter to divert to the detector means radiation returning from the retro-reflector means.

8. An optical apparatus for detecting light reflected from a target surface, which surface, which surface may be subject to position displacement, comprising:
    a radiation-propagating source on one optical arm of the apparatus so oriented that the rays strike the target at an angle other than perpendicular;
    retro-reflector means on the optical arm opposite the source, which receives reflected rays from, and returns them to, the target; and
    detector means on the optical arm adjacent the source which receives the rays after their second reflection from the target.

9. The optical apparatus of claim 8 wherein the retro-reflector means comprises an array of relatively small individual retro-reflectors, thereby minimizing the lateral display of individual rays as they go toward and return from the retro-reflector means.

* * * * *